United States Patent Office 3,258,475
Patented June 28, 1966

3,258,475
FILM-FORMING ORGANOMETALLIC
DERIVATIVES OF FATTY ACIDS
Raymond Noel Faulkner, Hanworth, and Leonard Alfred O'Neill, Hampton Hill, England, assignors to the United States of America as represented by the Secretary of Agriculture
No Drawing. Filed Aug. 13, 1963, Ser. No. 302,493
18 Claims. (Cl. 260—414)

A nonexclusive, irrevocable, royalty-free license in the invention herein described, throughout the world for all purposes of the United States Government, with the power to grant sublicenses for such purposes, is hereby granted to the Government of the United States of America.

This invention relates to novel film-forming organometallic materials. More particularly, this invention relates to novel derivatives of alkoxides of such metals as aluminum, titanium, and copper, which organometallic alkoxides we have now by the instant invention further reacted with the esters of the alcohols derived from the polyunsaturated vegetable oil fatty acids with acetoacetic acid or with the acetylacetonates of the said metals to thereby provide novel chelate complexes whose xylene or toluene solutions have adequate storage stability to gelation and which solutions per se may be applied as coating compositions to metal surfaces as whole media or in the form of additives in solutions of unmodified long oil alkyd or in chemically modified alkyd resin coating compositions to provide cured films that demonstrate selectively modified properties such as shortened drying times, and improved resistance to alkali, and in some instances even semipolar "coordinate" bonding, i.e., (chelation) in addition to the more usual polar form of bonding of the film with the monomolecular surface of the metal substrate, e.g., iron, mild steel, or copper, to thereby improve adhesion, perhaps by in situ chelation therewith by carboxyl or hydroxyl groups of the coating complex, especially in the presence of a wet carbon dioxide atmosphere that apparently provides a more reactable carbonate layer on the metal surface.

A broad object of our invention is the preparation of novel film-forming organometallic complexes whose xylene or toluene solutions have excellent storage stability to gelation, and which solutions can be applied as whole media surface coatings and also can be added in small proportions (about 2.5–5.0 percent based on the alkyd) to long oil alkyd solutions and to solutions of herein described chemically modified alkyds to improve the properties of films thereof.

Another object is the preparation of organometallic complexes comprising groups capable of desmotropic keto-enol shifts thereby providing coordinatable carbonyl groups to provide crosslinking and "uncoverable" potential hydroxyl groups to provide an in situ chelation-reinforced bonding of the coating to the surface of a metal substrate. Another object is the preparation of organometallic coatings for metals which coatings may gradually form additional functional groups that reactively also chelate with the monomolecular layer of atoms comprising the surface of the mild steel or similar metal substrate and thus augment and improve the adhesion thereto.

A more specific object is the stabilization of known aluminum and titanium alkoxides towards hydrolysis by chelating the alkoxide with the ester of an alcohol derived from an unsaturated fatty acid with a desmotropic keto-enol compound such as acetoacetic acid.

A still more specific object is the preparation of film-forming linseed alcohol or ricinoleyl alcohol-substituted acetoacetate chelates of the alkoxides of metals such as aluminum, titanium, and copper.

In order to define our terminology and thus facilitate a more rapid understanding of our discoveries and invention, we point out that aluminum tri-isopropoxide can be reacted with up to 3 moles of ethylacetoacetate to give, e.g., aluminum tri-(ethylacetoacetate) having the formula

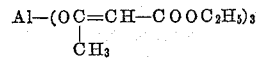

and that on interesterifying the ethyl moieties thereof with the unsaturated linseed fatty alcohol radical, one obtains the corresponding aluminum tri-(mixed linoleyl-linolenyl acetoacetates) plus byproduct ethanol. The corresponding di- and mono-aluminum chelates are prepared by reaction respectively with two or with one mole equivalent of unsaturated fatty acetoacetate.

The mixed linoleyl-linolenyl acetoacetates per se (preparation of which by interchange of ethyl acetoacetate and linseed alcohols is shown in Example 2) can be reacted with 1 mole equivalent of titanium tetra-isopropoxide to yield titanium tri-isopropxy mono-(linseed alcohol acetoacetates) which we also call the titanium tri-isopropoxy monochelate; the said monochelate can then be reacted with 2 mole equivalents of linseed oil fatty acids to provide the type of novel film-forming complex shown in Formula I.

Similarly, a toluene solution of aluminum tri-isopropoxide can be reacted with 1 mole equivalent of the mixed linseed alcohol acetoacetates to yield aluminum di-isopropoxy mono-(linseed alcohol acetoacetates) that can be reacted with linseed fatty acids to form the analogous aluminum complex.

COORDINATE BOND GENERAL FORMULA I

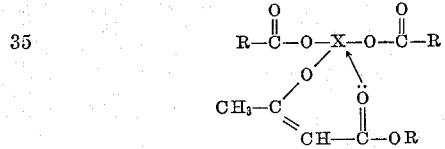

where X is a member of the group consisting of trivalent aluminum and the trivalent titanium mono-isopropoxy radical (hereinafter designated as Ti(OPr), and R represents an unsaturated aliphatic linseed-derived radical selected from the group consisting of linoleyl, linolenyl, oleyl, and mixtures thereof.

Otherwise stated, organometallic chelates corresponding to Formula I may be considered as the products from reacting 2 moles linseed fatty acids, 1 mole linseed alcohol acetoacetates, and 1 mole of a member selected from the group consisting of aluminum tri-isopropoxide and titanium tetra-isopropoxide, (Ti(OPr)₄), the metal isopropoxide being first refluxed with the fatty acetoacetates and the thusly formed complex then being reacted with the linseed fatty acids.

Another type of novel organometallic chelate of our invention is represented by Coordinate Bond General Formula II.

FORMULA II

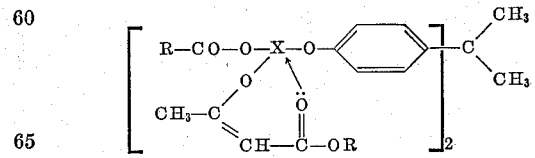

wherein R is an unsaturated aliphatic radical selected from the group consisting of linoleyl, linolenyl, and mixed linoleyl-linolenyl, and X is selected from the group consisting of trivalent aluminum and the trivalent Ti(OPr) radical.

Products corresponding to the above general formula may be obtained from the reaction of 1 mole linseed fatty acids, 1 mole linseed alcohol acetoacetates, ½ mole diphenylol propane, and 1 mole of either aluminum tri-isopropoxide or titanium tetra-isopropoxide. A typical preparation is described in Example 8, wherein the intermediate obtained from reacting a metal isopropoxide with the fatty acetoacetates is then reacted with the fatty acid and diphenylol propane.

Difunctional organometallic chelates corresponding to Coordinate Bond General Formula III, comprise another class of our novel products.

FORMULA III

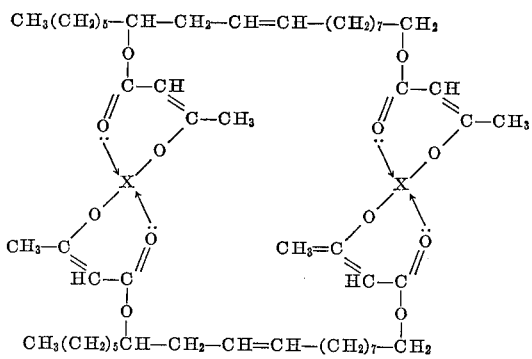

wherein X is a radical selected from the group consisting of the Al-mono-isopropoxide radical, the Ti di-(isopropoxide) radical, and divalent copper. (Product obtained by reacting 1 mole of ricinoleyl di-(acetoacetate) and 1 mole of either titanium tetra-(isopropoxide), aluminum tri-isopropoxide, copper acetate, or copper chloride.)

Products closely related to those of general Formula III may also be obtained by reacting 1 mole of either aluminum tri-(ethylacetoacetate) or copper di-(ethylacetoacetate) with 1 mole of dicinoleyl alcohol, and in these instances X represents respectively the aluminum mono-acetoacetate radical or the divalent cupric ion. However, in the last mentioned "aluminum" reaction, Formula III is modified to the extent shown in Formula IIIb, below:

FORMULA IIIb

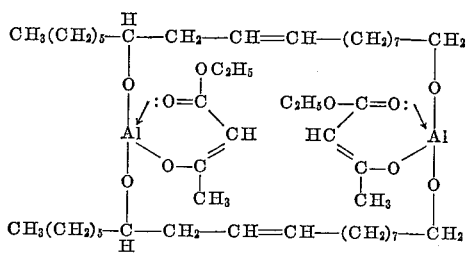

Still another type of metal chelate complex of our invention is shown in Formula IV.

FORMULA IV

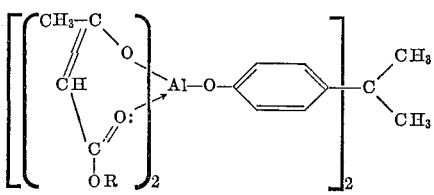

wherein R is an aliphatic radical selected from those of the linoleyl, linolenyl, and mixed linoleyl-linolenyl alcohols. (Product is obtained from the reaction of aluminum tri-isopoxide (1 mole), diphenylol propane (½ mole), and linseed alcohol acetoacetates (2 moles).)

In accordance with the objects of our invention we have now prepared film-forming metallo-organic chelates corresponding to the above formulas as well as some corresponding chelated derivatives of unmodified and of chemically modified long oil alkyd resins, which chelated derivatives are prepared by mixing organic solvent solutions of our novel organo-metallic chelates with an equimolar proportion of the alkyd.

By way of introduction to the examples, it will be recognized that the properties of our novel chelates are at least partly the result of constituents that exhibit the property of desmotropic tautomerism as exemplified in the following graphic formulas:

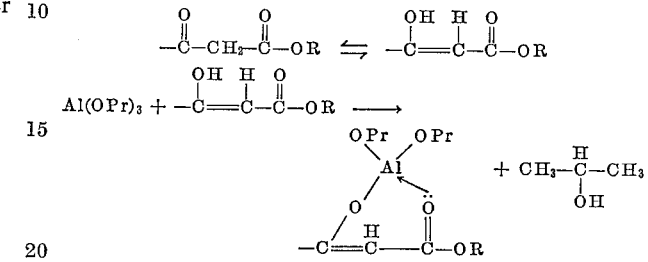

As starting materials, we employed the commercially available aluminum tri- and titanium tetra-isopropoxides, as well as similarly available long chain fatty alcohols, and oil modified alkyds. Aluminum tri- and titanium tetra(ethyl-acetoacetate), the former having the formula

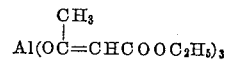

were prepared from the respective commercial aluminum tri- and titanium tetra-isopropoxides by interchange with ethylacetoacetate in a manner analogous to that shown in Example 3. Copper di-(ethylacetoacetate) (M.P. 180° C.) was prepared by interchange of copper acetate and 2 moles of ethylacetoacetate. Recinoleyl di-acetoacetate was prepared by interchange of ricinoleyl alcohol and ethylacetoacetate and was recovered by molecular distillation to avoid possible polymerization. It had a molecular weight (ebulliometric) of 442, a hydrogenation value of 110, a Wijs iodine value of 108.1, a carbonyl value (mg. KOH/gm.) of 220, and a saponification value of 236. Solutions of aluminum mono-isopropoxy di-(ethylacetoacetate) in xylene or toluene and having the molecular formula

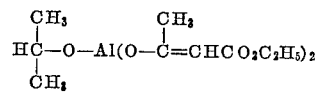

had good storage stability.

Alkyd acetoacetates were prepared by interchange reaction using equimolar proportions of the alkyd and of ethylacetoacetate in toluene solution, about ⅔ of the expected ethanol based on the hydroxyl groups in the alkyd being obtained. The toluene and unreacted ethylacetoacetate were removed under vacuum. The product gave a red coloration with ferric chloride, showing chelation of the metal.

A neutralized alkyd was prepared by treating an ether solution of a long oil alkyd with an ether solution of diazomethane followed by azeotropic distillation of the ether and unreacted diazomethane, and removal of the final traces of ether under vacuum.

An acetylated alkyd was prepared by refluxing a 50 percent solution of a long oil alkyd in naphtha with acetic anhydride for 1¼ hours and then removing the excess acetic anhydride under vacuum.

Reaction of Al(isoPr)$_3$ (1 mole), β-laurylamino-α-phenyl ethyl alcohol (1 mole), linseed dimer acids (½ mole), and linseed fatty acids (1 mole) gave a stable solution which dried to a tack-free film. However, on further aging it became mottled in appearance and softer, thus suggesting that its poor drying properties result mainly from a hydrolytic instability of this system rather than from the antioxidant properties of the amine.

Castor oil acetoacetates (1 mole) were refluxed for 1 hour in xylene with Al tri-(ethylacetoacetate) (1 mole)

to form a product having the structure of the type shown in Formula III*b*. Films cured by heating at 140° C. for 1 hour were very soft and slightly tacky.

The product from Ti(OPr)$_4$, linoleic ethanolamides, and linseed fatty acids had poor film-forming properties.

The complex from Ti(OPr)$_4$ (1 mole) and linseed acetoacetates (1 mole) was reacted with linseed fatty acids (2 moles) to provide a reddish solution that with cobalt naphthenate dried to a very soft film. The reaction product corresponds to Formula I in which X is Ti(OPr).

Direct incorporations of certain of our organometallic complexes into alkyds and chemically modified alkyds were accomplished as follows:

Room temperature additions of the product from the reaction of 1 mole aluminum isopropoxide, 1 mole mixed linoleyl-linolenyl acetoacetates, and 2 moles linseed fatty acids (Formula I) to solutions of oil-modified alkyd in the same solvent resulted in gelation at addition levels exceeding about 3 percent unless sufficient solvent was added to lower the solids content to a level of about 20 percent or unless a monomeric reactive compound such as butanol or a chelating agent such as ethyl acetoacetate was added. Compared with the alkyd control a slight increase in the adhesion to mild steel was noted. This improvement was offset, however, by greater yellowing and by decreased resistances to alkali and to water.

Similar additions to diazomethane-neutralized alkyds showed that the latter were significantly more resistant to gelation. Additions to acetylated alkyds showed that this chemical modification still more markedly reduced the tendency of the alkyd solution to gel.

Titanium diacetylacetonate was exceptional in being readily compatible with the alkyd. Compared with alkyds containing the same amount of the analogous titanium diethyl acetoacetate complex, the storage stability was greatly improved, and films thereof showed enhanced hydrolytic stability over those from untreated alkyds.

The following specific examples further describe our discoveries and invention:

*Example 1*

Ethylacetoacetate 170 gm. (1.3 moles) corresponding to 0.5 mole excess was heated under nitrogen with 225 gm. (0.8 mol ) mixed oleyl-linoleyl alcohols and 250 ml. toluene in a 2-liter flask connected to a fractionating column. The ethanol produced in the interchange was distilled off as the toluene/ethanol binary, and the reaction was stopped when pure toluene began to distil. The reaction time was about 3 hours. After removing the unreacted excess ethylacetoacetate under vacuum, the product was purified by distillation in a molecular still to avoid possible polymerization. The mixed oleyl-linoleyl acetoacetates (285 g.) had a molecular weight of 344, iodine value of 108, carbonyl value of 166, and a saponification value of 169.

*Example 2*

The fatty acetoacetates from the mixed linoleyl-linolenyl (linseed) alcohols were prepared in the manner of Example 1 and obtained in about identical yield. The product had a molecular weight of 340, an iodine value of 150, a carbonyl value of 168, and a saponification value of 171.

*Example 3*

Aluminium tri-isopropoxide 40.8 g. (0.2 mole) and the linoleyl-linolenyl acetoacetate of Example 2, 70.4 g. (0.2 mole), i.e., equimolar proportions, were reacted in the apparatus of Example 1 by heating in toluene solvent (700 ml.) under a nitrogen atmosphere, 12 g. (0.2 mole) of byproduct isopropanol being fractionated off as an azeotrope with about 150 ml. toluene. The reaction time was about 3 hours. The product, in 550 ml. toluene consisted predominantly of the di-isopropoxy-aluminum-(linoleyl-linolenyl acetoacetate) complex having the formula

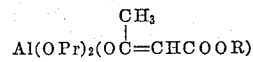

where R is linoleyl-linolenyl. Solutions of the complex in xylene or in toluene had good stability against gelation. The aluminum di-isopropoxy "linseed" monoacetoacetate may also be referred to as the di-isopropoxy-aluminum monochelate.

*Example 4*

The corresponding mono-isopropoxy aluminum-di-(linoleyl-linolenyl-acetoacetate) complex was prepared in the manner of Example 3 but employing 140.8 g. (0.2 mole) of the mixed unsaturated fatty alcohol acetoacetates and 40.8 g. (0.2 mole) of aluminum tri-isopropoxide, about 24 g. (0.4 mole) of byproduct isopropanol being distilled off with about 200 ml. toluene. The reaction time was about 4 hours. Organic solvent solutions of the complex had even greater storage stability than the corresponding aluminum monochelate of Example 3.

*Example 5*

The corresponding aluminum tri-(linoleyl-linolenyl acetoacetate) complex was prepared using 168.4 g. (0.45 mole) of the mixed fatty alcohol acetoacetate and 30.6 g. (0.15 mole) aluminum isopropoxide in 700 ml. toluene. About 27 g. (0.45 mole) isopropanol distilled together with 250 ml. toluene during 4 to 5 hours. The triacetoacetate aluminum complex was a viscous liquid exhibiting a green fluorescence. The solvent-free product had $n_D^{20}$ of 1.4960 and molecular weight of 960, and was appreciably unchanged during 2 years storage under nitrogen in absence of solvent. Films prepared from a toluene or xylene solution containing 0.1 percent cobalt as naphthenate air-dried to a fairly tack-free film with good stability.

*Example 6*

49.6 g. (0.1 mole) of the di-isopropoxy aluminum mono-chelate of Example 3 in 250 ml. xylene was heated with 56 g. (0.2 mole) of linseed oil mixed fatty acids in 200 ml. xylene, 12 g. (0.2 mole) of byproduct isopropanol being distilled off as a binary during 2 to 3 hours. Xylene solutions of the aluminum complex having a structure corresponding to that shown in Formula I, supra, where X is trivalent aluminum, had good storage stability against gelation. When applied to a surface, the solutions air-dried to touch in less than ½ hour without a drier and hardened up on further ageing in air. The complex thus is the product from 2 moles linseed fatty acids, 1 mole Al-tri-isopropoxide, and 1 mole linseed alcohol acetoacetates.

*Example 7*

A toluene solution containing 0.1 mole of the aluminum di-chelate of Example 4 in 400 ml. toluene was heated with 11.4 g. (0.05 mole) of diphenylol propane in 60 ml. toluene. About 4 g. isopropanol byproduct was obtained during about 2 hours corresponding to 70 percent of theory of that required for complete interchange. The red colored solution containing 400 ml. toluene whose organometallic complex has the idealized structure shown in Formula IV had good storage stability and with 0.1 percent cobalt as naphthenate gave films that dried to touch in about ½ hour. However, the water and alkali resistance of the film were poor, and on accelerated weathering it was only slightly better than a linseed stand oil film. Expressed somewhat differently, the above organometallic complex is the product obtained from 1 mole aluminum tri-isopropoxide, ½ mole diphenylol propane, and 2 moles mixed linoleyl-linolenyl acetoacetates. The addition to a long oil alkyd of a toluene solution containing 2.5 percent of the chelate based on the alkyd solids gave films with cobalt drier that behaved well with respect to accelerated weathering and water resistance tests. As compared with the original alkyd there was improved adhesion to mild steel.

*Example 8*

A toluene solution containing 49.6 g. (0.1 mole) of the di-isopropoxy-aluminum (linoleyl-linolenyl acetoacetate) complex of Example 3 was reacted with 28 g. (0.1 mole) linseed oil fatty acids in 100 ml. toluene and 11.4 g. (0.05 mole) of diphenylol propane added as a solid, a total of about 12 g. (0.2 mole) byproduct isopropanol being distilled off during 3 to 4 hours. The red colored solution containing 250 ml. toluene had good stability and in the presence of cobalt drier formed a slightly yellow film which dried-to-touch and was fairly hard in about ½ hour. The film was not rapidly attacked by cold water and behaved better than a linseed stand oil film on weathering. Additions to an alkyd of solutions of the chelate complexes of this example and that of Example 7 (each equivalent to 2.5 percent by weight of the chelate based on the dry weight of alkyd) were made, the alkyd solutions with the additives then having solids contents of about 60 percent. The mixed solutions were clear. Films from the fortified alkyd solutions in the presence of cobalt naphthenate behaved well with respect to accelerated weathering and water resistance tests and showed greater adhesion to mild steel than did films of the unfortified alkyd control.

The organometallic complex of this example corresponds in structure to Formula II where "X" is aluminum. Expressed differently the complex is the product obtained from reacting 1 mole of linseed fatty acids, ½ mole diphenylol propane, 1 mole aluminum tri-isopropoxide, and 1 mole linseed alcohol acetoacetates.

*Example 9*

Similar additions (2.5%) of the aluminum complexes of Examples 6 and 7 were made to (1) a long oil alkyd in which the carboxyl groups had been neutralized by treatment with diazomethane and (2) to the corresponding alkyd which had also been acetylated by treatment with acetic anhydride, the concentrations of the alkyd solution being the same as in Example 8. Admixtures of the organometallic complexes with the modified alkyds had much better storage stability than admixtures with the unmodified alkyd at the same level of addition.

*Example 10*

We attempted to prepare a difunctional acetoacetate complex having structures corresponding to that of Formula III, by refluxing 22.5 g. (0.05 mole) ricinoleyl diacetoacetate and 10.02 g. (0.05 mole) aluminum tri-isopropoxide in 150 ml. boiling toluene. However, a large amount of intractable gel promptly formed in the flask.

Therefore, we refluxed 22.5 g. (0.05 mole) ricinoleyl diacetoacetate for 2 hours with 20.7 g. (0.05 mole) aluminum tri-(ethylacetoacetate) in 80 ml. xylene solution. The boiling point and refractive index of a sample of distillate at the column head corresponded to the values for xylene, indicating the apparent absence of reaction. However, the pale yellow solution gave a clear wet film on evaporation of the solvent, which on heating at 140° C. for 1 hour cured to a soft, rubbery film having poor resistance to boiling water and to hot alkali, although it was unaffected by immersion in cold alkali for 48 hours.

For comparison, we then refluxed 20.7 g. (0.05 mole) aluminum tri-(ethylacetoacetate) with 14.2 g. (0.05 mole) ricinoleyl alcohol in 80 ml. solvent. In toluene only a very slow interchange occurred, but in boiling xylene over 80 percent of the theoretical amount of ethanol was rapidly liberated during 3 to 4 hours. The resulting solution was stable to gelation. Films cured at 140° C. had good water resistance but poor resistance to cold alkali during 24 hours.

*Example 11*

22.5 g. (0.05 mole) ricinoleyl diacetoacetate and 16.0 g. (0.05 mole) copper di-(ethylacetaacetate) were refluxed for 2 hours in 40 ml. xylene. A small amount of reddish brown deposit formed indicating some decomposition of the copper derivative. Films obtained by evaporation of solvent at room temperature were partly crystalline but showed good stability to boiling water during 1 hour and to cold alkali after curing at 140° C. for 1 hour. When 15 ml. of octyl alcohol, i.e., a relatively non-volatile solvent, was incorporated into the above film-forming solution, crystallization of the film was prevented. Some product decomposition was also noted when 14.2 g. (0.05 mole) ricinoleyl alcohol and 16 g. (0.05 mole) copper di-(ethylacetoacetate) were reacted for 2 hours in 40 ml. toluene or in xylene, with evolution of 80–90 percent of the expected ethyl alcohol.

To avoid decomposition of the copper complex of ricinoleyl diacetoacetate, we then reacted 9.975 g. (0.05 mole) copper acetate $Cu(OCOCH_3)_2H_2O$, or alternatively 8.5 g. (0.05 mole) copper chloride, $CuCl_2 \cdot 2H_2O$, in 100 ml. 90%/10% methanol/distilled water and 22.5 g. (0.05 mole) ricinoleyl di-acetoacetate in 50 ml. methanol, progressively neutralizing the liberated byproduct acetic acid with 0.88 normal ammonium hydroxide to maintain a pH of 7–8. The viscous green resinous product (25 g.) was obtained by evaporation of the methanol under vacuum at below 50° C. The properties of the copper ricinoleyl di-acetoacetate were as follows: when cast from benzene or toluene solution, soft clear films formed by evaporation and cured at 140° C. for about 1 hour with a change of color from green first to yellow and then to light brown. The scratch hardness was intermediate between that of a linseed stand oil and that of an alkyd. The cured film was unaffected by cold or boiling water, or by alkali or cold dilute HCl but was slightly attacked by hot dilute HCl. It was insoluble in benzene, toluene, or in chlorinated solvents such as chloroform.

Potentiometric titrations of $Cu^{2+}$ and ricinoleyl diacetoacetate in 90 percent methanol solution and the infra red spectrum (with reference to that for ethyl acetoacetate) showed conclusively that the compound was a chelate formed from the linking of two acetoacetate groups to each copper ion. The copper complex of ricinoleyl di-acetoacetate therefore conforms to the structure of Formula III when "X" is divalent copper.

*Example 12*

A solution of aluminum tri-(ethyl acetoacetate) equivalent to about 20 percent by weight of isopropoxide based on the alkyd was added to a mixed xylene-naphtha-toluene solution of a long oil alkyd. Films obtained by evaporation were tested with respect to water and alkali resistance, yellowing by ammonia and ultraviolet light, scratch hardness, and the effect of accelerated weathering. Compared with films from the unfortified original alkyd or the unfortified alkyd acetoacetate, films of the aluminum trichelate-fortified chemically unmodified alkyd showed slightly improved adhesion to metal, better water resistance, less softening, better alkali resistance, and improved hardness. The originally pronounced yellowness of the metal chelate-treated film was appreciably bleached by extended exposure to ultraviolet light. Substitution of the corresponding titanium ethyl acetoacetate for the aluminum chelate complex promptly resulted in gelation of the alkyd.

*Example 13*

A 2.5 percent addition to a long oil alkyd in xylene-naphtha of the product from 1 mole $Al(—O—Pr)_3$, ½ mole diphenylol propane, and 2 moles mixed linseed acetoacetates (product of Formula IV) gave results substantially identical to those noted with the aluminum chelate of Example 12.

Example 14

Titanium di(acetylacetonate) was prepared in toluene solution by refluxing titanium isopropoxide (1 mole) and acetylacetone (2 moles), with liberation of byproduct isopropanol (2 moles). Films obtained by evaporation of toluene from a 20 percent by weight addition of the titanium di-isopropoxy-diacetylacetonate to a long oil alkyd and cured at 140° C. for 1 hour showed very good water and alkali resistance. Accelerated weathering tests (500 hours) caused very minor reduction in hardness and flexibility although water spotting was noted.

Example 15

A 50 percent solution of a long oil alkyd in xylol was refluxed with 16 percent by weight of Cu di-(ethylacetoacetate) as a 5 percent solution in benzene for 2 hours. Then a clear sticky green film was obtained by evaporation of the solvent. The film was cured at 140° C. to a benzene-insoluble relatively soft film. On standing overnight, the film became harder. Cold alkali had little effect on the film but in general its properties were about the same as those of the alkyd control.

Test methods used for the evaluation of coatings are described below.

Immersion tests for aqueous alkali and water resistance were caried out on films applied by brush respectively to steel rods (4" x ½") and to glass test tubes (6" x ½"). The films were aged for 4 days at 25° C. or stoved at 140°/1 hour according to the system under test. Pairs of the coated rods were immersed to ⅔ of their coated surface in (1) cold 1 percent aqueous sodium hydroxide for 4 hours and (2) gently boiling 0.2 percent aqueous sodium hydroxide for 15 minutes. The coated test tubes were similarly immersed in (1) cold water for 48 hours and (2) gently boiling water for 1 hour. The films were examined during the course of the test for blushing, blistering, solution, etc.

The accelerated weathering cycle used comprised exposure to the light of a carbon arc and intermittent water spray on degreased and abraded aluminum panels (6" x 3") coated by brush at a weight of about 0.25 g. per panel and aged 4 days at 25° C. or stoved at 140° C. for 1 hour. Panels were exposed to 500 hours accelerated weathering and scratch hardness and flexibility measurements were made after 0, 250 and 500 hours. The film was concurrently examined for water spotting, cracking, wrinkling, etc.

Scratch hardness was determined by the ball point method on films coated on 60 S.W.G. tinned steel panels (6" x 3").

Flexibility was evaluated with respect to the greatest mandrel diameter over which a 30 gauge panel could be bent to cause film rupture when viewed through a microscope. Adhesion tests were made by a pull off technique on films applied to mild steel test pieces by spinning and aged for 5 days at 25° C.

Having fully disclosed our invention, we claim:

1. Method of preparing organometallic chelates having the structure

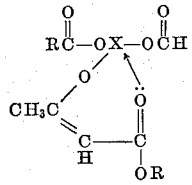

wherein $x$ is a member of the group consisting of trivalent aluminum and the trivalent titanium mono-isopropoxide radical and each R is independently selected from the group consisting of linoleyl, linolenyl, and oleyl, said method comprising forming linseed acetoacetates by fractionally distilling under nitrogen a toluene solution containing linseed alcohols and excess ethylacetoacetate until pure toluene begins to distill therefrom, purifying the mixed linseed acetoacetates, reacting a toluene solution of the mixed linseed acetoacetates with a toluene solution of a metal isopropoxide selected from the group consisting of aluminum tri-isopropoxide and titanium tetraisopropoxide to form an isopropoxy mixed linseed acetoacetate complex of the metal, and under nitrogen fractionally distilling byproduct isopropanol from an organic solvent solution containing the said complex and mixed linseed fatty acids.

2. Organometallic chelates corresponding to the formula

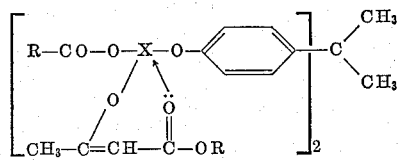

wherein each R is independently selected from the group consisting of linoleyl, linolenyl, and oleyl and X is selected from the group consisting of trivalent aluminum and the trivalent titanium mono-isopropoxide radical.

3. Organometallic chelates according to claim 2 where X is trivalent aluminum.

4. Organometallic chelates according to claim 2 wherein X is the trivalent titanium mono-isopropoxide radical.

5. An organic solvent solution of an organometallic chelate as defined in claim 2.

6. Method of preparing organometallic chelates as defined in claim 2 comprising distilling 2 to 3 molecular equivalents of byproduct isopropanol from a toluene solution containing equimolar amounts of linseed fatty acid and a member selected from the group consisting of di - isoproxy - aluminum (linoleyl - linolenyl acetoacetates) and tri-isopropoxy-titanium (linoleyl-linolenyl acetoacetates), adding 0.5 equivalent of solid diphenylol propane to the reaction solution, and continuing the reaction under reflux conditions for several hours.

7. Organometallic chelates corresponding to the formula

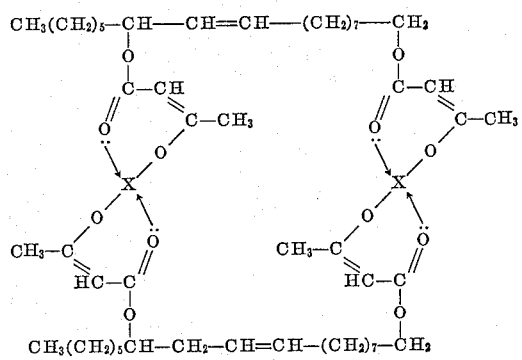

wherein X is selected from the group consisting of the aluminum mono-isopropoxide radical, the aluminum diethyl-acetoacetate radical, the titanium di-isopropoxide radical, and divalent copper.

8. The organometallic complex of claim 7 wherein X is the aluminum mono-isopropoxide radical.

9. The organometallic complex of claim 7 wherein X is the titanium di-isopropoxide radical.

10. The organometallic complex of claim 7 wherein X is the aluminum mono-ethyl acetoacetate radical.

11. An organic solvent solution of an organometallic chelate as defined in claim 7.

12. Method of preparing organometallic chelates as defined in claim 7 comprising refluxing in solution in an organic solvent selected from the group consisting of toluene and xylene equimolar amounts of a co-reacting pair selected from the group consisting of (a) ricinoleyl diacetoacetate and aluminum tri-(ethylacetoacetate), (b) ricinoleyl alcohol and aluminum tri-(ethylacetoacetate), (c)

ricinoleyl diacetoacetate and titanium isopropoxide, (d) ricinoleyl alcohol and copper di-(ethylacetoacetate), and (e) ricinoleyl diacetoacetate and aluminum tri-isopropoxide.

13. Copper di(ricinoleyl diacetoacetate).

14. Method of preparing copper di(ricinoleyl diacetoacetate) without decomposition comprising reacting a methanol solution containing equimolar amounts of copper acetate and ricinoleyl diacetoacetate, progressively neutralizing the by-product acetic acid to maintain the pH at a value between 7 and 8, and then evaporating the methanol at not above 50° C. at subatmospheric pressure.

15. The organometallic complex having the formula

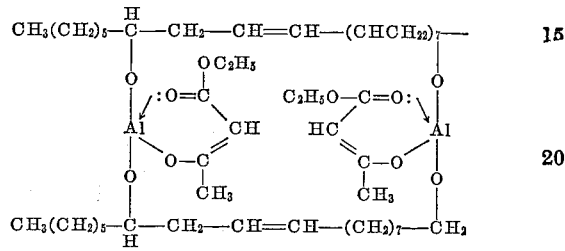

16. Organometallic chelates corresponding to the formula

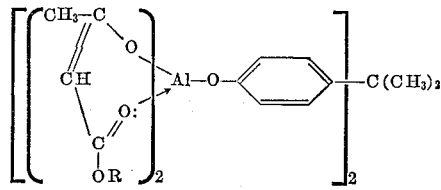

wherein R is a member of the group consisting of linoleyl, linolenyl, and oleyl.

17. An organic solvent solution of a chelate as defined in claim 16.

18. Method of preparing organometallic chelates having the structure shown in claim 16 comprising forming an intermediate by refluxing an organic solvent solution containing 1 mole of aluminum tri-isopropoxide and 2 moles of an acetoacetate of a fatty alcohol derived from linseed oil, after removal of the 2 moles of by-product isopropanol adding 0.5 mole of diphenylol propane, and continuing the reaction.

References Cited by the Examiner

UNITED STATES PATENTS

| | | | |
|---|---|---|---|
| 1,980,441 | 11/1934 | Salzberg | 260—22 |
| 2,659,711 | 11/1953 | Wilkins et al. | 260—2 |
| 2,857,363 | 10/1958 | Easley et al. | 260—75 |
| 2,871,135 | 1/1959 | Weiss | 260—414 |
| 2,892,780 | 6/1959 | Rinse | 260—22 |
| 2,932,659 | 4/1960 | Orthner et al. | 260—2 |
| 2,933,475 | 4/1960 | Hoover et al. | 260—22 |
| 3,002,854 | 10/1961 | Brill | 260—2 |
| 3,013,895 | 12/1961 | Agruss | 260—22 |
| 3,053,804 | 9/1962 | Caldwell et al. | 260—2 |
| 3,057,753 | 10/1962 | Blatz | 260—2 |

FOREIGN PATENTS 734,114   7/1955   Great Britain.

LEON J. BERCOVITZ, *Primary Examiner.*

R. W. GRIFFIN, *Assistant Examiner.*